United States Patent [19]
Asakura et al.

[11] Patent Number: 6,002,576
[45] Date of Patent: *Dec. 14, 1999

[54] TRIMMING CAPACITOR HAVING A VOID LOCATED WITHIN THE DIELECTRIC

[75] Inventors: Kyoshin Asakura, Sabae; Yasunobu Yoneda, Takefu, both of Japan

[73] Assignee: Murata Manufacturing Co., Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/911,159

[22] Filed: Aug. 14, 1997

[30] Foreign Application Priority Data

Aug. 15, 1996 [JP] Japan ................................ 8-215658

[51] Int. Cl.⁶ .................................................. H01G 4/06
[52] U.S. Cl. ............................ 361/311; 361/313; 361/320
[58] Field of Search .............................. 361/301.1, 301.2, 361/301.4, 303–305, 306.1–306.2, 307, 308.1, 308.2, 309–313, 320, 321.1, 321.2, 321.4, 321.5, 306.3

[56] References Cited

U.S. PATENT DOCUMENTS

| | | | |
|---|---|---|---|
| 4,308,570 | 12/1981 | Burn | 361/320 |
| 4,875,136 | 10/1989 | Sano et al. | 361/321 |

*Primary Examiner*—Kristine Kincaid
*Assistant Examiner*—Anthony Dinkins
*Attorney, Agent, or Firm*—Ostrolenk, Faber, Gerb & Soffen, LLP

[57] ABSTRACT

A trimming capacitor with less drop in Q due to laser trimming, wherein a non-reducing ceramic material which can be sintered either within a neutral atmosphere or a reducing atmosphere is used as the material of the ceramic dielectric. A trimming capacitor electrode is provided on the surface of or within a ceramic dielectric containing internal capacitor electrodes. Part of the trimming capacitor electrode is removed by a laser beam to reduce an area thereof facing the internal capacitor electrode, to adjust the electrostatic capacitance to a desired value. The use of non-reducing ceramic material reduces the amount of dielectric material that is converted to semiconductor material during laser trimming.

14 Claims, 5 Drawing Sheets

6,002,576

TRIMMING CAPACITOR HAVING A VOID LOCATED WITHIN THE DIELECTRIC

BACKGROUND OF THE INVENTION

1. Field of the Invention

The present invention relates to a trimming capacitor and more particularly to a trimming capacitor which is adapted to being trimmed by a laser beam.

2. Description of the Prior Art

A trimming capacitor is used when an adjustable electrostatic capacitance that can take various values is required. For instance, as shown in FIG. 7, a trimming capacitor 50 has a wide trimming capacitor electrode 54 on the surface of a ceramic dielectric 51 containing internal capacitor electrodes 52 and 53. The reference numerals 60 and 61 in FIG. 7 denote external input and output electrodes. The electrostatic capacitance can be adjusted by reducing the area of the trimming capacitor electrode 54 facing the capacitor electrode 53, by removing a part 54a of the trimming capacitor electrode 54 with a laser beam L.

A dielectric ceramic material is generally used as the material of the ceramic dielectric 51. The dielectric ceramic material is normally sintered in air and is reduced readily within a neutral or reducing atmosphere.

However, because the dielectric ceramic material is used as the material of the ceramic dielectric 51 in the prior art trimming capacitor 50, there has been a problem that, when heated by the high energy of the laser beam L directed at the trimming capacitor electrode 54, a part 51a of the ceramic dielectric 51 is reduced and is turned into a semiconductor, thus dropping the Q of the capacitor.

Accordingly, there is a need to provide a trimming capacitor in which the drop in the Q during laser trimming can be reduced.

SUMMARY OF THE INVENTION

In order to achieve the aforementioned goal, a trimming capacitor of the present invention comprises:

(a) a dielectric made of a non-reducing ceramic material which can be sintered either within a neutral atmosphere or a reducing atmosphere;

(b) a trimming capacitor electrode provided either on the surface of or within the dielectric at a position where it is able to be trimmed by a laser beam; and (c) an internal capacitor electrode provided within the dielectric and facing the trimming capacitor electrode to generate electrostatic capacitance.

Because the material of the dielectric is a non-reducing ceramic material, the dielectric is hardly reduced and very little of the dielectric is turned into a semiconductor, even if a temperature of the dielectric becomes high due to the influence of the high energy of the laser beam irradiated onto the trimming capacitor electrode.

The above and other advantages of the invention will become more apparent in the following description and the accompanying drawings in which like numerals refer to like parts.

BRIEF DESCRIPTION OF THE DRAWINGS

FIG. 9b is a sectional view of the trimming capacitor of FIG. 9a; and

FIG. 10 is a sectional view of an alternative embodiment of the trimming capacitor of FIG. 9a.

DETAILED DESCRIPTION OF EMBODIMENTS OF THE INVENTION

Embodiments of a trimming capacitor of the present invention will be explained below with reference to the appended drawings.

Figure 1:
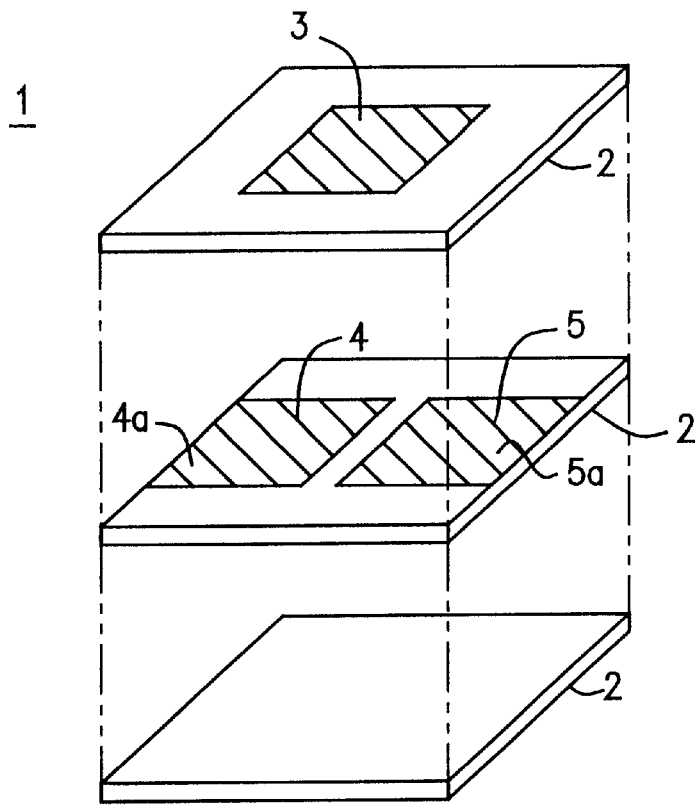
FIG. 1 is an exploded perspective view showing a portion of a trimming capacitor according to one embodiment of the present invention.

As shown in FIG. 1, a trimming capacitor 1 comprises a dielectric ceramic sheet 2 provided with a trimming capacitor electrode 3 on the surface thereof, a dielectric ceramic sheet 2 provided with internal capacitor electrodes 4 and 5 on the surface thereof, and a protecting dielectric ceramic sheet 2. Other sheets (not shown) may also be included.

Each dielectric ceramic sheet 2 is made of a non-reducing ceramic material which can be sintered either within a neutral atmosphere or a reducing atmosphere. The ceramic material is mixed with a binder or the like and then formed into a green sheet by means of a doctor blade, for example.

The trimming capacitor electrode 3 is formed on the middle of the surface of the dielectric ceramic sheet 2 by using conductive paste such as Ni, Cu, Ag—Pd and Pd by means of printing, sputtering or the like.

The internal capacitor electrode 4 is positioned on the left side of the dielectric ceramic sheet 2 and a lead portion 4a thereof is exposed at the left side of the sheet 2. The internal capacitor electrode 5 is positioned on the right side of the sheet 2 and a lead portion 5a thereof is exposed at the right side of the sheet 2. The internal capacitor electrodes 4 and 5 are formed on the surface of the dielectric ceramic sheet 2 by using conductive paste such as Ni, Cu, Ag—Pd and Pd by means of printing, sputtering or the like. Base metals such as Ni and Cu may be used as the material of the internal capacitor electrodes 4 and 5 to reduce the production cost because the non-reducing ceramic material is used as the material of the dielectric ceramic sheet 2, so the internal capacitor electrodes 4 and 5 will not be oxidized when sintering the dielectric ceramic sheet 2.

In contrast, in the prior art trimming capacitor, because a conventional dielectric ceramic material was adopted as the material of the dielectric ceramic sheet, the internal capacitor electrodes would be oxidized during sintering, so electrical characteristics such as electrical conductivity would drop if a base metal were used as the material of the internal capacitor electrodes. Therefore, noble metals such as Pd, Ag—Pd had to be used as the material of the internal capacitor electrodes in the prior art trimming capacitor even though the cost would increase.

The dielectric ceramic sheets 2 provided with the capacitor electrodes 3 through 5 formed on the respective surfaces thereof are laminated with the protecting dielectric sheet 2 to form a laminate and are then sintered either within a neutral atmosphere or a reducing atmosphere, thereby forming an integrated ceramic dielectric 6.

Figure 2:
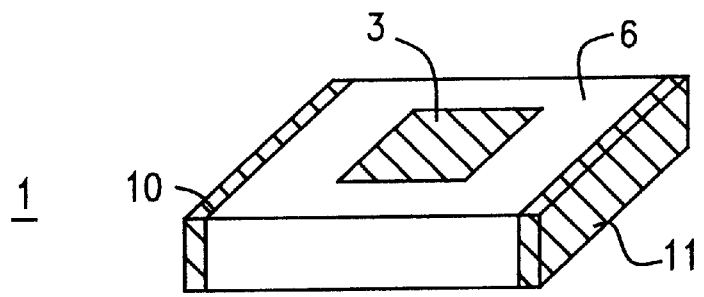
FIG. 2 is a perspective view of the trimming capacitor corresponding to FIG. 1.

As shown in FIG. 2, input/output external electrodes 10 and 11 are formed on the right and left end faces of the laminate. The external electrodes 10 and 11 are formed by means of sputtering, coating or the like and are made of Cu, Ag—Pd, Ag or Pd. The input/output external electrode 10 is electrically connected with the lead portion 4a of the internal capacitor electrode 4 and the input/output external electrode 11 is electrically connected with the lead portion 5a of the internal capacitor electrode 5. Thus, electrostatic capacitance is generated at the parts where the trimming capacitor electrode 3 faces the internal capacitor electrodes 4 and 5. The trimming capacitor electrode 3 is formed so as to have a wide area and the electrostatic capacitance at this time is normally greater than a desired value thereof.

Figure 3:
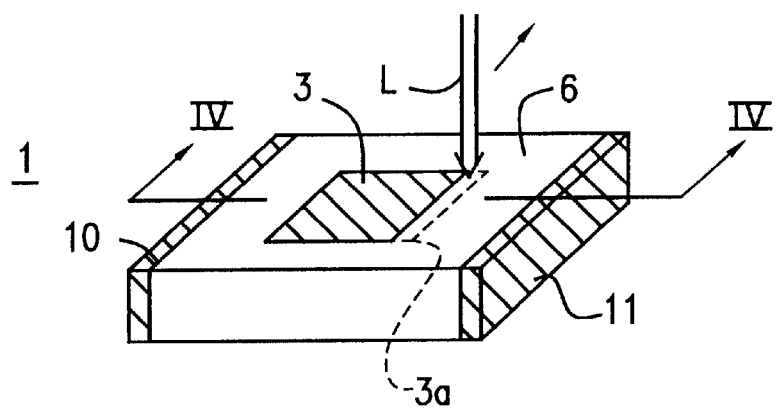
FIG. 3 is a perspective view corresponding to FIG. 2 showing a mode of laser trimming.
Figure 4:
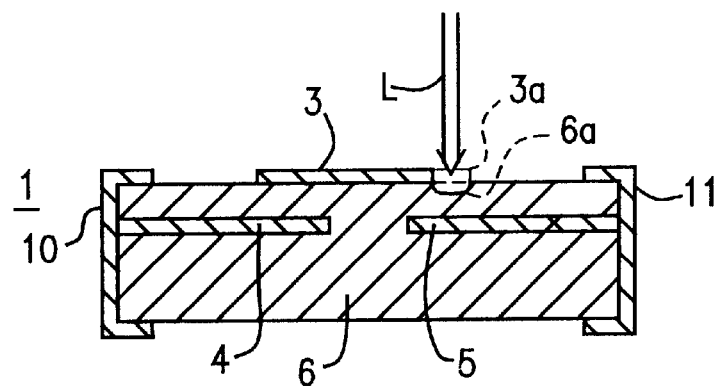
FIG. 4 is a sectional view taken along line IV—IV in FIG. 3.

Next, to obtain the desired capacitance, the laser beam L is directed at the edge of the trimming capacitor electrode 3 to remove a part 3a of the trimming capacitor electrode 3 as shown in FIGS. 3 and 4. At this time, a temperature of a part of the ceramic dielectric 6, or more specifically, of a part thereof near the removed part 3a of the trimming capacitor electrode 3 between the internal capacitor electrode 5 and the trimming capacitor electrode 3, becomes high due to the influence of the high energy of the laser beam L directed at the trimming capacitor electrode 3. However, because the non-reducing ceramic material is adopted as the material of the ceramic dielectric 6, hardly any reducing occurs and very little of the ceramic material is turned into semiconductor even if the temperature of this part becomes high.

Accordingly, it is possible to lessen the reduction in the Q value due to the laser trimming of the capacitor.

It is noted that a part 6a of the ceramic dielectric 6 may be removed as shown in FIG. 4, depending on the intensity of the laser beam L. However, this poses no problem as to the quality of the trimming capacitor 1.

Thus, by removing the part 3a of the trimming capacitor electrode 3 with the laser beam L, the area of the electrode 3 which faces the internal capacitor electrode 5 is reduced, and the electrostatic capacitance is thereby reduced to a desired value.

It is noted that the trimming capacitor of the present invention is not confined only to the embodiment described above and may be modified variously within the scope of the spirit thereof.

For example, it is possible to coat the trimming capacitor electrode 3 with a protection film made of resin, glass, ceramics or the like after trimming it with the laser beam L.

Figure 5:
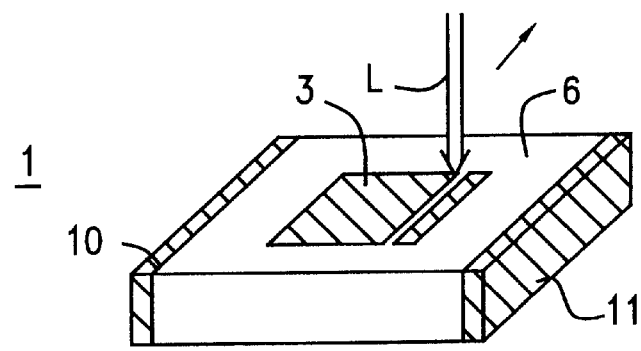
FIG. 5 is a perspective view showing another mode of laser trimming.

It is also possible to direct the laser beam L onto a position closer to the center so as to divide the trimming capacitor electrode 3 into parts, as shown in FIG. 5, instead of using it to trim the edge thereof, to obtain a desired electrostatic capacitance.

Figure 6:
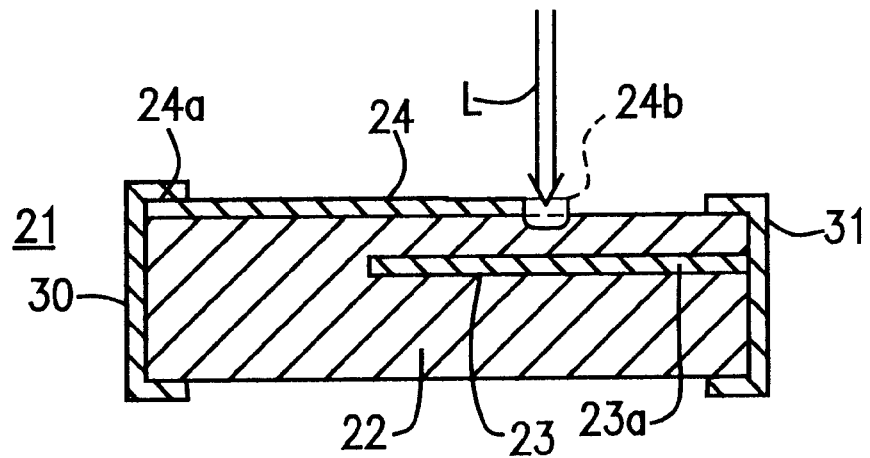
FIG. 6 is a sectional view showing still another embodiment of the invention.
Figure 7:
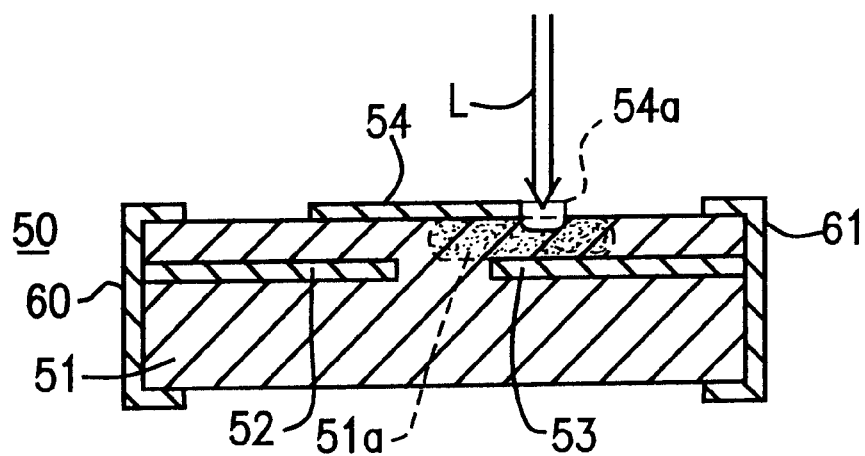
FIG. 7 is a sectional view showing a prior art trimming capacitor.

Further, the trimming capacitor may be constructed in other ways. For instance, as shown in FIG. 6, it may be constructed with a trimming capacitor electrode 24 having a wide area provided on the surface of a ceramic dielectric 22 containing an internal capacitor electrode 23, a lead portion 24a of the trimming capacitor electrode 24 being electrically connected with an external input/output electrode 30 provided at the left end of the ceramic dielectric 22, and a lead portion 23a of the internal capacitor electrode 23 being electrically connected with an external input/output electrode 31 provided at the right end of the ceramic dielectric 22. Electrostatic capacitance is generated where the trimming capacitor electrode 24 faces the internal capacitor electrode 23. An edge 24b of the trimming capacitor electrode 24, for example, may be removed with the laser beam L to reduce the area thereof which faces the internal capacitor electrode, to adjust the electrostatic capacitance to a desired value.

Figure 8:
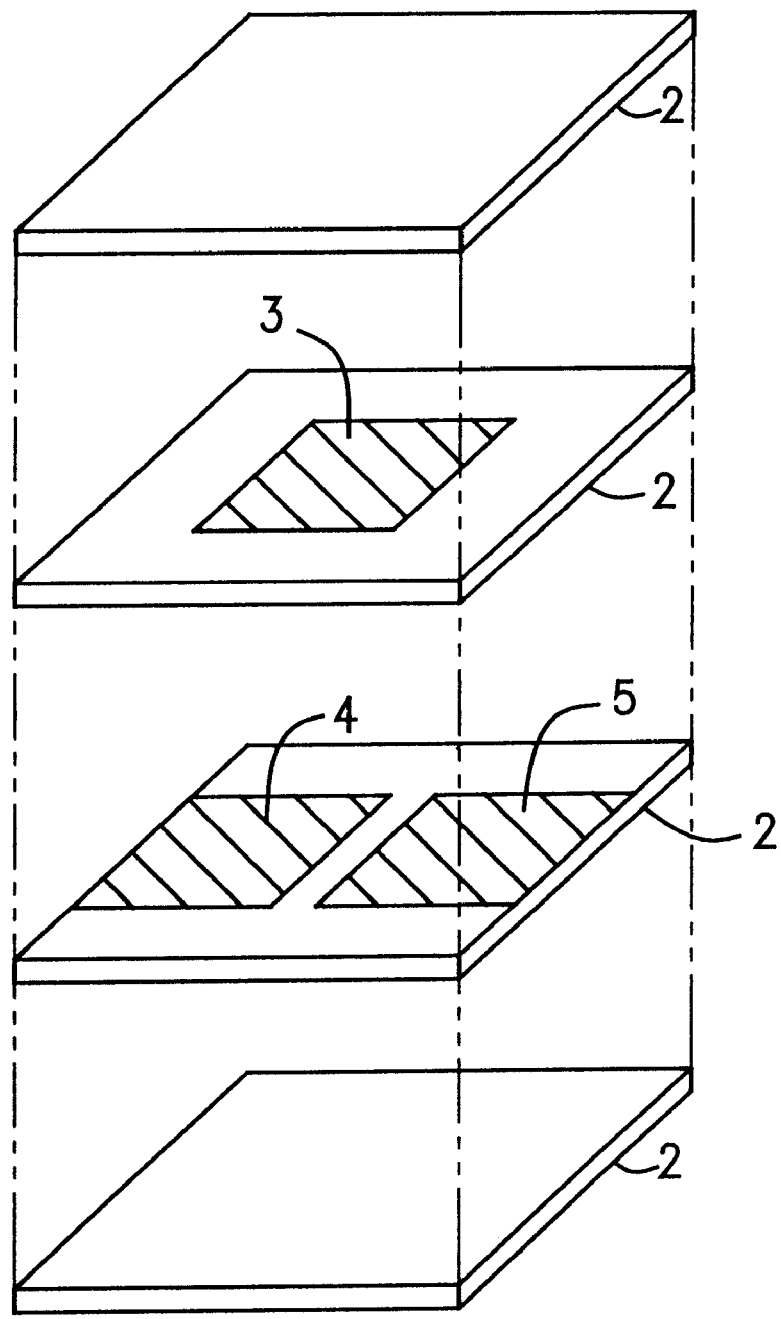
FIG. 8 is an exploded perspective view showing a portion of a trimming capacitor according to an alternative embodiment of the present invention.
Figure 9A:
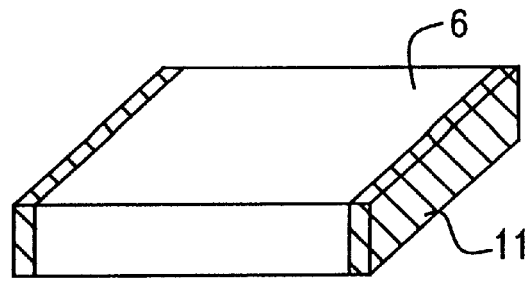
FIG. 9a is a perspective view of the trimming capacitor corresponding to FIG. 8.
Figure 9B:
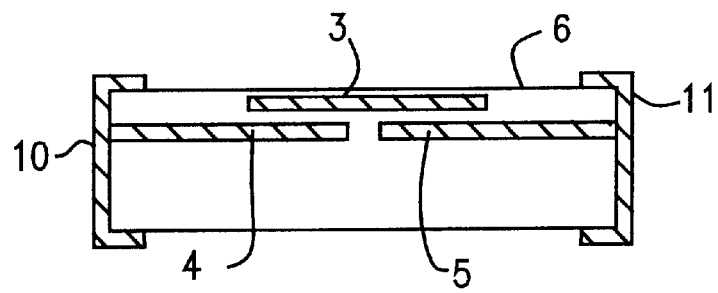
Figure 10:
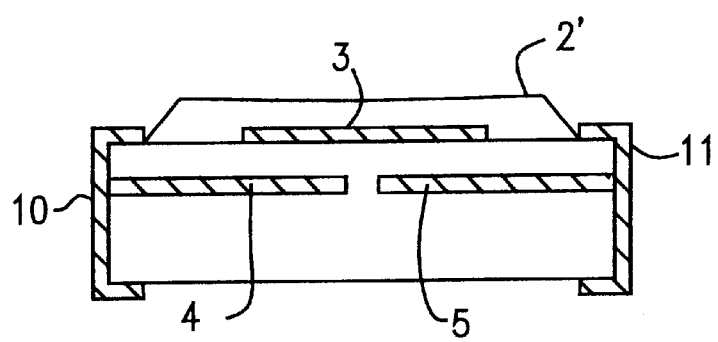

The trimming capacitor electrode 3 or 24 need not always be formed on the surface of the ceramic dielectric 6 or 22 and may instead be embedded within the ceramic dielectric 6 or 22 (FIGS. 8–10). In this case, Ni and Cu may be used as the electrode material. The capacitor is fabricated by placing a protecting dielectric ceramic sheet 2 (or film 2'; FIG. 10) on the sheet 2 on which the trimming capacitor electrode 3 is formed and by sintering all the sheets to form a body as shown in connection with FIGS. 1 and 2.

The inventors fabricated the trimming capacitors under the fabrication conditions shown in Table 1.

TABLE 1

| | Ceramic Material | Sintering Sintering Temperature | Sintering Atmosphere (partial pressure of oxygen during sintering) |
| --- | --- | --- | --- |
| First Example | CaZrO$_3$ non-reducing ceramic material | 980° C. | Reducing gas atmosphere (1.5 × 10$^{-10}$ Mpa) |
| Second Example | CaZrO$_3$ non-reducing ceramic material | 1250° C. | Reducing gas atmosphere (7.8 × 10$^{-12}$ Mpa) |
| Prior Art Example | CaZrO$_3$ dielectric ceramic material | 1280° C. | Air atmosphere (2.1 × 10$^{-2}$ Mpa) |

A CaZrO$_3$ non-reducing ceramic material has been used as the material of the dielectric. A prior art trimming capacitor using a CaZrO$_3$ dielectric ceramic material was also fabricated for comparison. A partial pressure of oxygen during sintering was set at 1.5×10$^{-10}$ Mpa in case of the first example and set at 7.8×10$^{-12}$ Mpa in case of the second example. Meanwhile, the partial pressure of oxygen during sintering was set at 2.1×10$^{-2}$ Mpa in case of the prior art example.

Table 2 shows measured results of Q values before and after laser trimming of the trimming capacitors fabricated as described above.

TABLE 2

| | Q before Trimming | Q after Trimming |
| --- | --- | --- |
| First Example | 2300 | 700 |
| Second Example | 1800 | 600 |
| Prior Art Example | 2200 | 300 |

It can be seen from Table 2 that the use of the non-reducing ceramic material allows the drop of the Q value after the laser trimming to be suppressed as compared to the prior art trimming capacitor.

As is apparent from the above description, because the non-reducing ceramic material is used as the material of the dielectric in the present invention, resistance of this dielectric to reduction becomes excellent and less of the dielectric is turned into semiconductor than in the prior art, even if the temperature of the dielectric becomes high due to the influence of the high energy of the laser beam irradiated onto the trimming capacitor electrode.

While embodiments have been described, variations will occur to those skilled in the art within the scope of the present inventive concept.

What is claimed is:

1. A trimming capacitor, comprising:
   a dielectric made of a non-reducing ceramic material which can be sintered either within a neutral atmosphere or a reducing atmosphere;
   a trimming electrode located on a portion of the dielectric;
   a void located in the dielectric adjacent to and extending along a longitudinal edge of the trimming electrode; and
   an internal electrode provided within the dielectric and facing the trimming electrode so as to generate an electrostatic capacitance.

2. The trimming capacitor of claim 1, wherein the trimming electrode is disposed on a surface of the dielectric.

3. The trimming capacitor of claim 1, wherein the trimming electrode is disposed within the dielectric.

4. The trimming capacitor of claim 1, wherein the trimming electrode is substantially covered with a protection film taken from the group consisting of resin, glass, and ceramics.

5. The trimming capacitor of claim 1, wherein the trimming electrode has a coloration in accordance with an intensity of the laser beam.

6. The trimming capacitor of claim 1, wherein the void is sized and shaped in accordance with an intensity of a laser beam for trimming the trimming electrode.

7. The trimming capacitor of claim 1, wherein the dielectric is formed from $CaZrO_3$.

8. A trimming capacitor, comprising;
   a dielectric made of a non-reducing ceramic material which can be sintered either within a neutral atmosphere or a reducing atmosphere;
   a trimming electrode located on a portion of the dielectric, the trimming electrode having at least first and second portions formed by dividing the trimming electrode with a laser beam;
   a void located in the dielectric adjacent to and extending along longitudinal edges of the trimming electrode where the trimming electrode is divided into said first and second portions; and
   an internal electrode provided within the dielectric and facing the trimming electrode so as to generate an electrostatic capacitance.

9. The trimming capacitor of claim 8, wherein the trimming electrode is disposed on a surface of the dielectric.

10. The trimming capacitor of claim 8, wherein the trimming electrode is disposed within the dielectric.

11. The trimming capacitor of claim 8, wherein the trimming electrode is substantially covered with a protection film taken from the group consisting of resin, glass, and ceramics.

12. The trimming capacitor of claim 8, wherein the trimming electrode has a coloration in accordance with an intensity of the laser beam.

13. The trimming capacitor of claim 8, wherein the void is sized and shaped in accordance with an intensity of the laser beam.

14. The trimming capacitor of claim 8, wherein the dielectric is formed from $CaZrO_3$.

* * * * *